Sept. 30, 1958 T. J. PEARSALL 2,853,981
ENGINE COOLING SYSTEM
Filed Sept. 28, 1956 2 Sheets-Sheet 1

INVENTOR.
Thomas J. Pearsall
BY
Hauke & Hauberg
ATTORNEYS

Sept. 30, 1958
T. J. PEARSALL
2,853,981
ENGINE COOLING SYSTEM
Filed Sept. 28, 1956
2 Sheets-Sheet 2
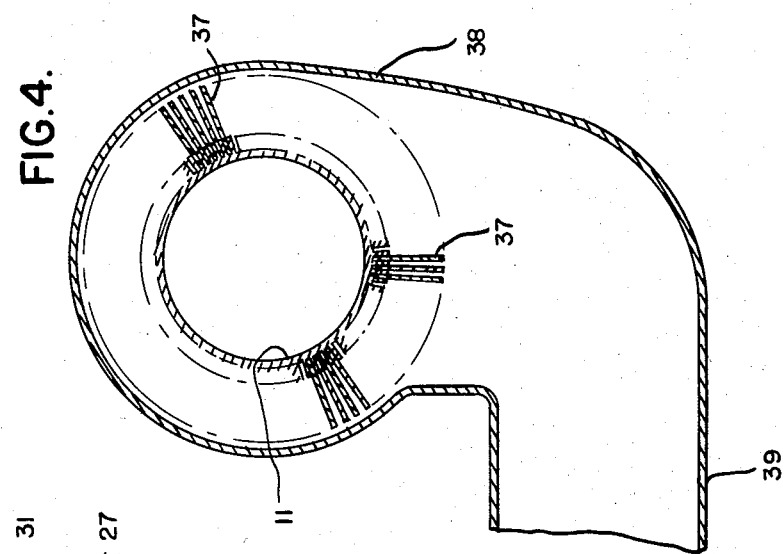
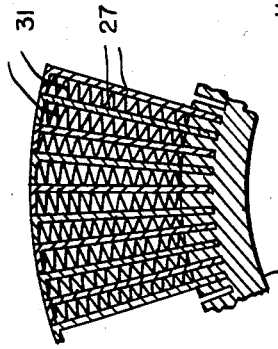
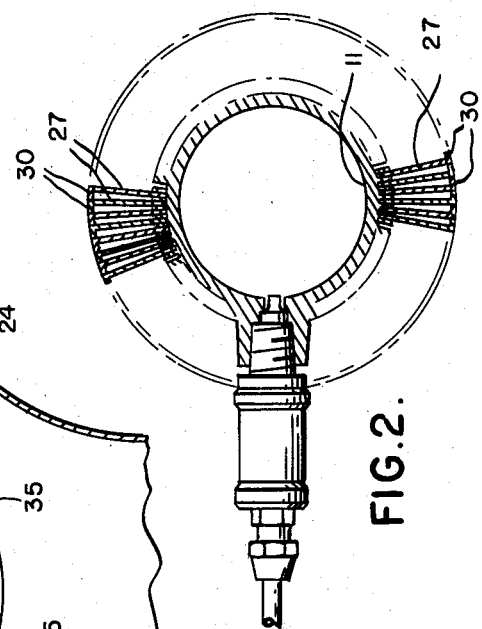
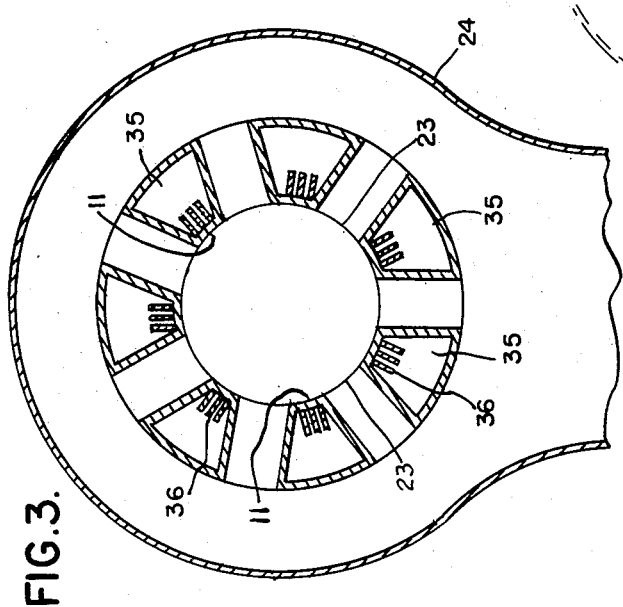
INVENTOR.
Thomas J. Pearsall
BY

United States Patent Office 2,853,981
Patented Sept. 30, 1958

2,853,981

ENGINE COOLING SYSTEM

Thomas J. Pearsall, Detroit, Mich., assignor to Continental Aviation & Engineering Corporation, Detroit, Mich., a corporation of Virginia Application September 28, 1956, Serial No. 612,632

4 Claims. (Cl. 123—41.63)

My invention relates to engine cooling and more particularly to air cooling of a free-piston type internal combustion engine.

Generally, free piston engines have heretofore utilized liquid cooling systems, or, if air cooling was desired, some exterior means of forcing cooling air over the hot engine areas was required. In analyzing cooling problems from the standpoint of a desire to reduce engine weight and size, it was found that the free-piston engine construction is actually made to order for providing its own air cooling system, since the space of the air compressing cylinder may be utilized to greater advantage by compressing air alternately on opposite sides of the piston. Air compressed during its stroke in one direction may be utilized in normal fashion for purging and supercharging the combustion cylinder while the air compressed during its opposite stroke may be directed in heat exchange relation with the combustion cylinder and associated air intake and gas exhaust pipes.

An object of the invention, consequently, is to cool a free piston engine by utilizing the return stroke of the air compressor piston to force cooling air in heat exchange relation with the engine.

Another object of the invention is to improve free piston engine cooling by providing a finned combustion cylinder and utilizing the return stroke of the air compressor piston to direct cooling air over the fins.

A further object of the invention is to cool the combustion cylinder, air intake ports, and gas exhaust ports of a free piston engine by constructing an enclosed finned area around the cylinder and pipes and through which cooling air is directed from the air compressor cylinder.

For a clearer understanding of my invention, reference may be had to the accompanying drawings illustratting a preferred embodiment of the invention in which like characters refer to like parts throughout the several views and in which Fig. 1 is a side elevational view, partly in section, of a preferred free piston engine utilizing this invention.

Fig. 2 is a fragmentary cross-section taken substantially on the line 2—2 of Fig. 1.

Fig. 3 is a fragmentary cross section taken substantially on the line 3—3 of Fig. 1.

Fig. 4 is a cross-section taken substantially on the line 4—4 of Fig. 1.

Fig. 5 is a fragmentary detail of another modification of the fin structure.

Figure 6:
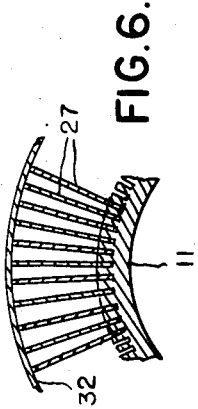
Fig. 6 is a fragmentary detail of yet another modification of the fin structure.

A preferred type of two cycle free piston internal combustion engine 10 is illustrated as having a combustion cylinder 11, air compressor cylinder 12, and bounce chamber 13. Opposed free piston assemblies 14 are operable in the cylinders and comprise inner power pistons 15 reciprocating in the combustion cylinder 11, compressor pistons 16 reciprocating in the compressor cylinders 12, and bounce pistons 17 reciprocating in the bounce chambers 13.

As the piston assemblies 14 are driven outward on the power stroke, the compressor pistons 16 compress air in the outer ends of the compressor cylinders 12 and the bounce pistons 17 compress air in the bounce chambers 13. The compressed air from the outer end of each compressor cylinder 12 is conducted by any suitable means such as pipes 20 and shroud 24 to air intake ports 25 provided in the combustion cylinder 11. This air is utilized to purge the combustion cylinder 11 at the outermost portion of the piston stroke and to supply supercharging in the conventional two-stroke free piston engine manner. Combustion gas exhaust ports 22 are provided around the cylinder 11 and are connected to an exhaust collector ring shroud 26.

The compressed air in the bounce chambers 13 bounces the piston assemblies 14 inwardly for the compression-ignition stroke of the engine. On this stroke, the heretofore wasted motion of the compressor pistons 16 is utilized in my invention to blow air over the engine for cooling.

Figure 1:
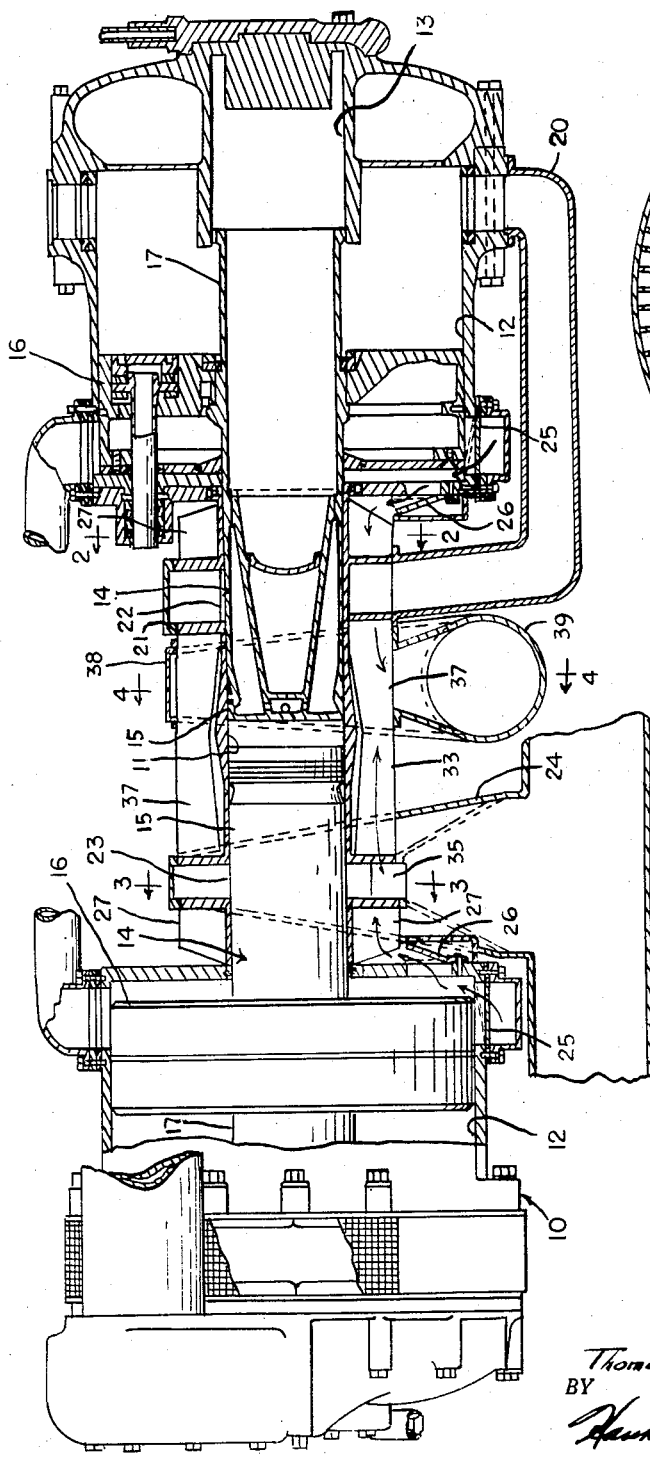

Inlet valves 25 and outlet valves 26 are provided at the inner end of each compressor cylinder 12, preferably as shown in Fig. 1. The valves 25 and 26 are preferably constructed of a flexible synthetic fabric impregnated with rubber or other desirable material. The inlet valves 25 open inwardly as indicated by the dotted position in Fig. 1 to admit air into the inner side of each compressor cylinder 16 on the outward or power stroke of the piston assembly 14, and the outlet valves 26 open outwardly as indicated on the inward or compression stroke of the piston assembly 14.

A plurality of radial fins 27 are annularly disposed around the outer surface of the combustion cylinder 11, except in the vicinity of the exhaust ports 22 and intake ports 23. The spaces between the fins 27 are enclosed by any means, such as by bent over fin tips 30 shown in Fig. 2, by corrugated spacing elements 31 shown in Fig. 5, or by an annular shroud member 32 shown in Fig. 6, any of these means providing longitudinal air passages through which the air expelled from the outlet means 26 is forced in heat exchange relation with the combustion cylinder 11 and the fins 27, as indicated by the directional flow arrows in Fig. 1.

A plurality of open passages 35 are provided by the bridge-like structures of the air intake ports 23 and the exhaust ports 22 respectively connected to the shrouds 24 and 21. Cooling air passing the fins 27 also will flow through the passages 35, in which are disposed additional radial cooling fins 36 as indicated in Fig. 3. More fins 37 are provided between the intake and exhaust ports, and are preferably enclosed for at least a portion of their length by a shroud 38 connected to a pipe 39 or any means for disposing of the heated air.

Although I have described and shown but a few embodiments of my invention, it will be apparent to one skilled in the art to which the invention pertains that various changes and modifications may be made therein without departing from the spirit of the invention or the scope of the appended claims.

I claim:

1. A free piston type internal combustion engine having a cylinder structure comprising axially aligned combustion and air compressor cylinders, and a piston structure reciprocating in said cylinders and operable to compress air alternately in each end of said air compressor cylinder, means conducting compressed air from one end of said compressor cylinder to said combustion cylinder for purging and supercharging same, and means operable to conduct cooling air from the other end of said compressor cylinder and in heat exchange relation with said engine.

2. A free piston type internal combustion engine having a cylinder structure comprising axially aligned combustion and air compressor cylinders, and a piston structure reciprocating in said cylinders and operable to compress air alternately in each end of said air compressor cylinder, said combustion cylinder having air intake means and combustion gas exhaust means, means conducting compressed air from one end of said compressor cylinder to said air intake means for purging and supercharging said combustion cylinder and means operable to conduct cooling air from the other end of said compressor cylinder and in heat exchange relation with said combustion cylinder, said air intake means, and said exhaust means.

3. A free piston type internal combustion engine having a cylinder structure comprising axially aligned combustion and air compressor cylinders, and a piston structure reciprocating in said cylinders and operable to compress air alternately in each end of said air compressor cylinder, means conducting compressed air from one end of said compressor cylinder to said combustion cylinder for purging and supercharging same, and means operable to conduct cooling air from the other end of said compressor cylinder and in heat exchange relation with said engine, said combustion cylinder having a plurality of spaced radially extending fins and means enclosing the spaces between said fins, the cooling air being conducted through said spaces and in heat exchange relation with said combustion cylinder and said fins.

4. A free piston type internal combustion engine having a cylinder structure comprising axially aligned combustion and air compressor cylinders, and a piston structure reciprocating in said cylinders and operable on the power and compression strokes to compress air respectively in outer and inner ends of said air compressor cylinder, means conducting compressed air from the outer end of said compressor cylinder to said combustion cylinder for purging and supercharging same, and means operable to conduct cooling air from the inner end of said compressor cylinder and in heat exchange relation with said engine.

References Cited in the file of this patent

UNITED STATES PATENTS 1,036,288     Matricardi  ------------ Aug. 20, 1912